United States Patent [19]
Piepho et al.

[11] Patent Number: 5,884,776
[45] Date of Patent: Mar. 23, 1999

[54] DYNAMIC CLASSIFIER WITH HOLLOW SHAFT DRIVE MOTOR

[75] Inventors: Robert R. Piepho, Wadsworth; Donald R. Dougan, Canton, both of Ohio

[73] Assignee: The Babcock & Wilcox Company, New Orleans, La.

[21] Appl. No.: 832,932

[22] Filed: Apr. 4, 1997

[51] Int. Cl.⁶ .................................. B04B 5/12; F16C 3/00
[52] U.S. Cl. .......................... 209/714; 110/220; 110/232; 464/183
[58] Field of Search ..................... 209/713, 714; 110/220, 232; 464/183; 310/61, 75 D

[56] References Cited

U.S. PATENT DOCUMENTS

| | | | |
|---|---|---|---|
| 3,651,941 | 3/1972 | Imris | 209/714 |
| 3,914,630 | 10/1975 | Lloyd et al. | 310/61 |
| 4,257,880 | 3/1981 | Jones | 209/714 |
| 4,609,251 | 9/1986 | Nakoaka et al. | 310/75 D |
| 5,025,930 | 6/1991 | Barthelmess | 209/714 |
| 5,120,431 | 6/1992 | Cordonnier | 209/714 |
| 5,223,757 | 6/1993 | Staub et al. | 310/61 |
| 5,263,655 | 11/1993 | Giammaruti et al. | 241/119 |

OTHER PUBLICATIONS

B&W Brochure, "The DSVS™ Rotating Classifier" published 1994.

*Primary Examiner*—Joseph S. Valenza
*Assistant Examiner*—Joe Dillon, Jr.
*Attorney, Agent, or Firm*—Daniel S. Kalka; Robert J. Edwards

[57] ABSTRACT

A dynamic classifier for a coal pulverizer has an improved drive mechanism which is mounted on top of a pulverizer and concentric with the classifier axis of rotation and is directly controllable. The drive mechanism is a variable-speed DC or AC electric motor having a hollow motor shaft. The motor can produce classifier rotor rotational speeds of between 50 and 200 rpm. The classifier rotor is supported from the hollow motor shaft. A coal feed pipe passes through the hollow motor shaft and classifier rotor shaft into the pulverizer.

9 Claims, 3 Drawing Sheets

DYNAMIC CLASSIFIER WITH HOLLOW SHAFT DRIVE MOTOR

BACKGROUND OF THE INVENTION

1. Field of the Invention

The present invention relates generally to the field of coal classifiers and pulverizers used to crush and pulverize and sort furnace fuel coal for combustion, and in particular to a new and useful dynamic classifier having a hollow shaft drive motor for the top section of a vertical axis coal pulverizer.

2. Description of the Related Art

The use of dynamic, or externally driven, coal classifiers to improve control of product particle size distribution is coming into increasing prominence as a supplemental technology to low $NO_x$ coal burners for reducing environmental pollutants. Dynamic coal classifiers are currently used to enhance the control of coal particle size and to improve the capacities of vertical-spindle pulverizers. A large percentage of dynamic coal classifiers are retrofit on existing pulverizers. High costs and difficult installation are the biggest barriers to widespread retrofitting of dynamic classifiers to existing pulverizers.

Vertical-spindle pulverizers usually receive raw coal through a feed pipe at the center of the grinding table rotation. The classifier is concentric with and rotates above and about the same grinding table center axis. Further, the coal output lines to the burners are usually positioned around the top of the pulverizer. The output lines are usually four or more pipes extending from the top of the pulverizer. This orientation of the input and output pipes on the pulverizer gives rise to special problems with respect to arranging the classifier's mechanical drive components.

Since the central axis of the classifier is occupied by the feed shaft, vertically-oriented motors used to drive the classifier rotation must be connected to the classifier rotor by V-belt or chain drives positioned to one side of the feed pipe. Alternatively, the motor may be connected to the classifier by gear-type speed reducers having large, hollow shafts. In each case, potential problems arise with respect to interference of drive components with planned or existing output pipes.

Speed reduction or control from the drive shaft of electric motors typically used to operate a classifier is required to obtain the low and variable rotation speeds desired. An electric or hydraulic motor in combination with speed reduction mechanisms is commonly used with classifiers to obtain operating rotational speeds of between 50 and 200 rpm.

These known classifiers and drive mechanisms have several drawbacks, including the high cost and difficult retrofit installation. The additional space occupied by the classifier drive mechanism is premium and sometimes difficult to obtain, such as when the height of the pulverizer must be increased as a result of the retrofit of the dynamic classifier.

SUMMARY OF THE INVENTION

It is an object of the present invention to provide a dynamic classifier for a coal pulverizer which can be easily and relatively inexpensively retrofit to existing pulverizer designs.

It is a further object of the invention to conserve space used by the dynamic classifier drive mechanism.

It is a further object to eliminate additional gear reducers or other speed reduction mechanisms connecting the drive motor and the classifier.

Accordingly, a dynamic classifier is provided having an improved drive means which is mounted on top of a pulverizer and concentric with the classifier axis of rotation and is directly controllable. The drive means can produce classifier rotor rotational speeds of between 50 and 200 rpm. The classifier rotor is supported by the drive means. A coal feed pipe passes through the center of the drive means and classifier rotor shaft. The drive means is a variable-speed DC or AC electric motor having a hollow motor shaft.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
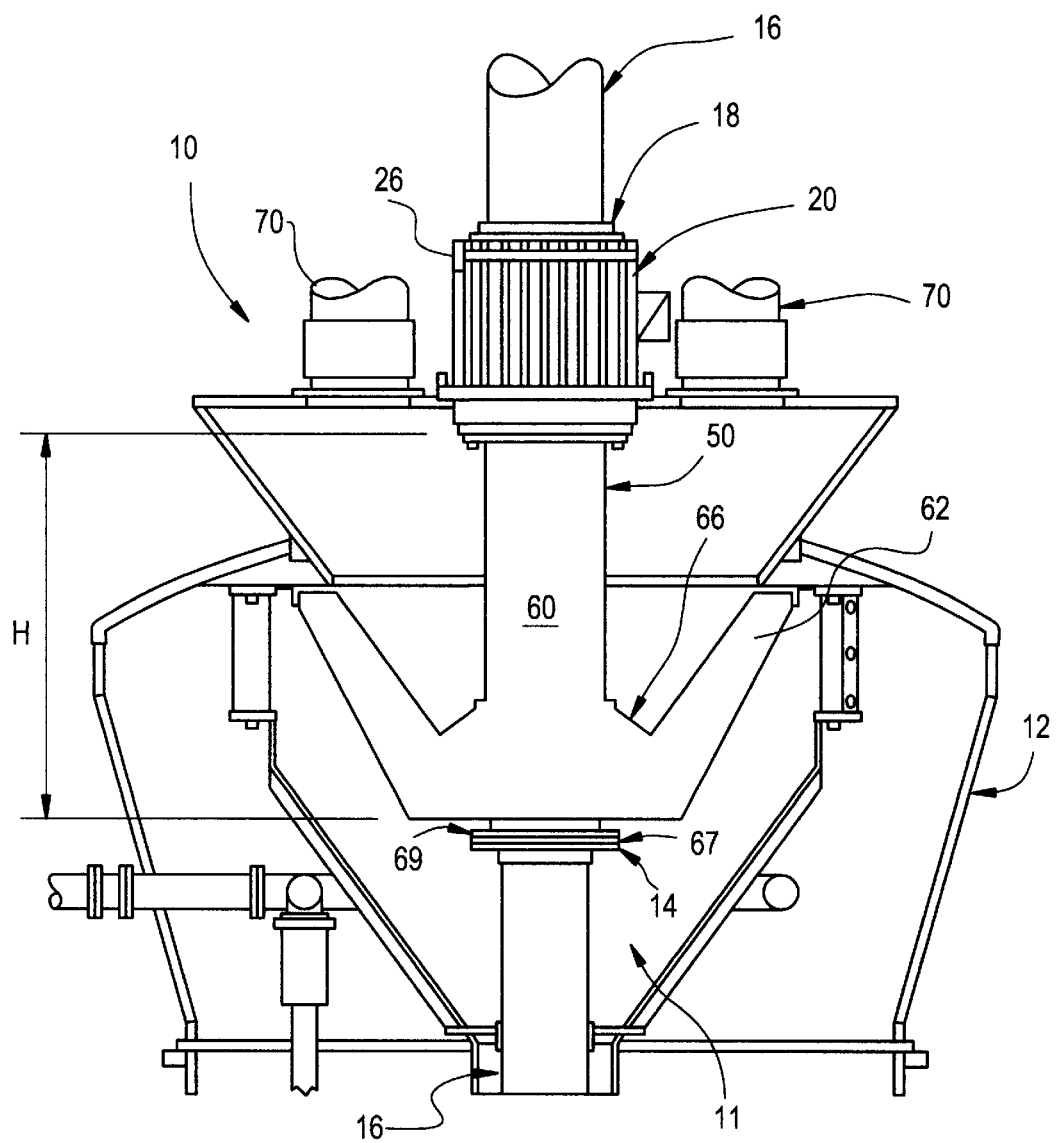
FIG. 1 is a sectional side elevational view of the top section of a vertical axis pulverizer.

Referring now to the drawings, in which like reference numerals are used to indicate the same or similar elements, FIG. 1 shows the top section of a coal pulverizer 10, including a classifier chamber 11. Mill housing 12 surrounds the classifier chamber 11, which contains classifier rotor 60. At the top of coal pulverizer 10 and mill housing 12, a centrally located coal feed pipe 16 extends down into the pulverizer 10. Raw, unprocessed coal is gravity fed through coal feed pipe 16 into the mill section 90 of the pulverizer 10. Coal feed pipe 16 has a diameter D (shown in FIG. 4), which is preferably about 14 to 24 inches. Pulverized coal rises in mill housing 12 and enters classifier chamber 11 through an inlet section 91 of the wall of chamber 11.

A variable speed motor 20 is positioned concentrically around coal feed pipe 16 at the top of pulverizer 10. Motor 20 is directly connected to classifier rotor 60, which has hollow classifier rotor shaft 50 surrounding coal feed pipe 16. The variable speed motor 20 drives classifier rotor 60 and rotates it about stationary coal feed pipe 16.

Stationary coal feed pipe 16 is connected to the stationary air seal shoe 14 below classifier rotor 60. Air seals 67 are provided between the stationary air seal shoe 14 and the rotating labyrinth seal 69 connected to the classifier rotor 60 to prevent leakage of pressurized and dust-laden air from the classifier chamber 11.

Processed coal exits pulverizer 10 through classifier chamber 11 and burner supply pipes 70. A total of four or more burner supply pipes 70 are positioned around central coal feed pipe 16 on the top of pulverizer 10 at equal intervals. Burner supply pipes 70 carry processed coal to furnace burners (not shown) for combustion.

Figure 3:
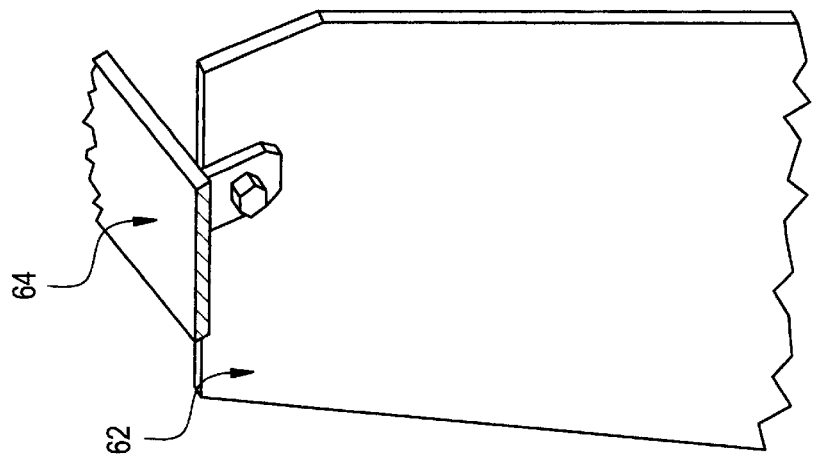
FIG. 3 is a perspective view of a rotor blade of the classifier rotor of FIG. 2.
Figure 2:
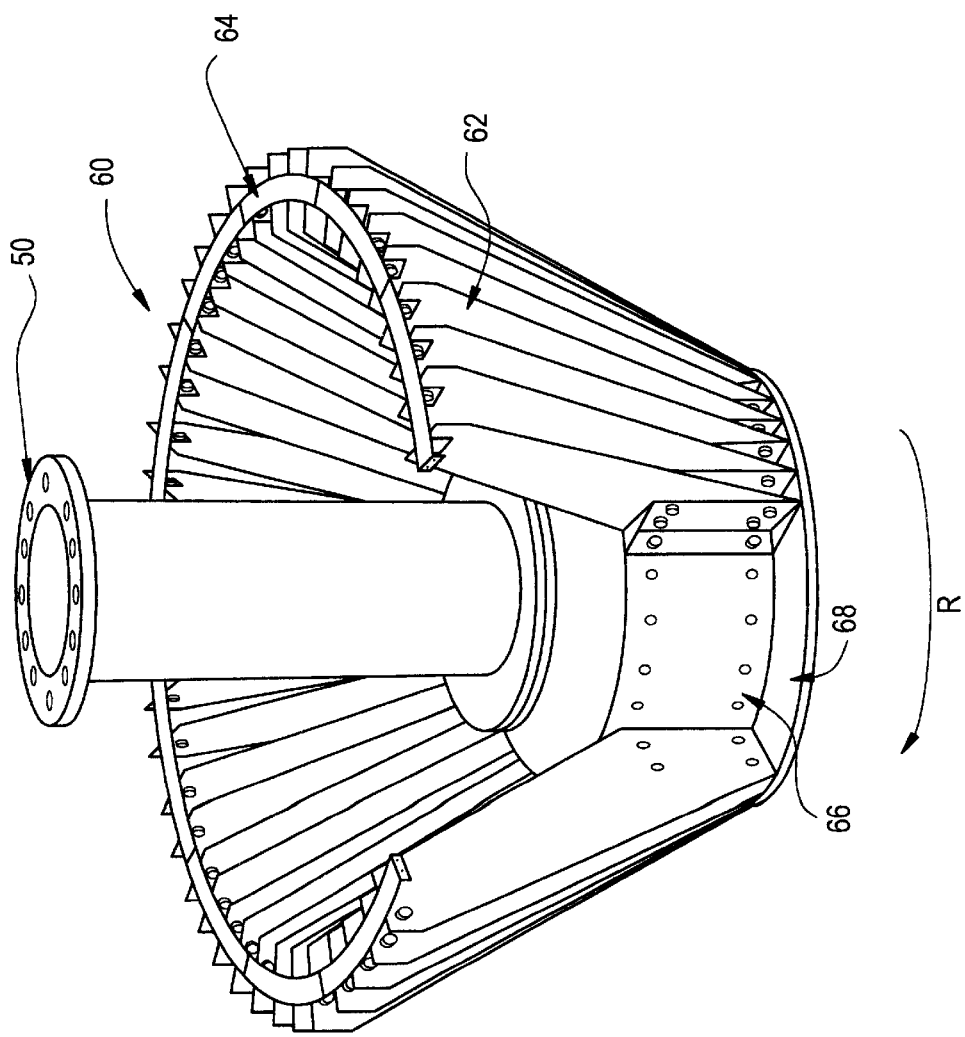
FIG. 2 is a perspective view of a classifier rotor with some of the rotor blades removed.

Referring now to FIGS. 2 and 3, in which the classifier rotor 60 is shown in more detail, flanged hollow classifier rotor shaft 50 is connected to the top of hub 66. Hollow classifier rotor shaft 50 has a diameter sufficiently large to allow coal feed pipe 16 to pass therethrough without contacting the internal surface of classifier rotor shaft 50.

Several classifier blades 62 are connected to hub 66 and extend vertically outward. A series of flat blade stiffeners 64 connect the top edges of blades 62 to provide additional support. A classifier rotor bottom cover 68 is connected to blades 62 and hub 66. Classifier rotor bottom cover 68 has a hole through its center to allow the coal feed pipe 16 (see FIG. 1) to pass through. The classifier rotor is preferably rotated in direction R when used in a pulverizer as shown in FIG. 1.

Figure 4:
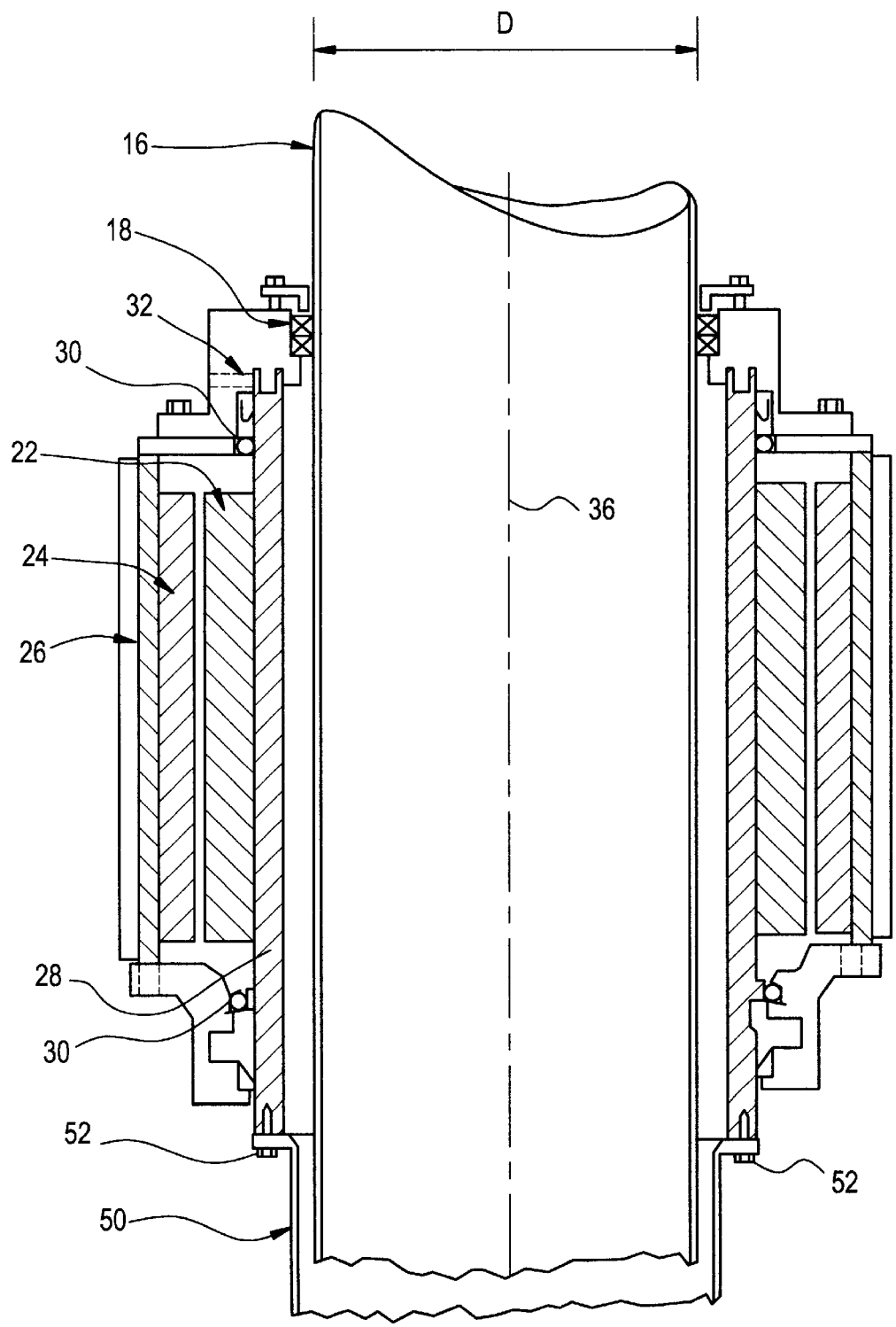
FIG. 4 is a sectional side elevational view of a motor used with the invention.

FIG. 4 shows a detail of the variable speed motor 20 positioned on the top of pulverizer 10. Motor 20 has motor housing 26, which is supported on top of pulverizer 10, as seen in FIG. 1. The motor 20 is generally cylindrical in plan. Motor 20 is an electric motor, and may be a DC or AC, variable frequency motor. Motor 20 is preferably a low speed, controllable motor.

Coal feed pipe 16 extends through the center of motor 20, inside motor drive shaft 28. Motor drive shaft 28 and coal feed pipe 16 do not contact each other. Motor drive shaft 28 is securely connected to classifier rotor shaft 50 with bolts 52 or other known fastening means. Motor drive shaft 28 is also connected to motor housing 26 via bearings 30. Bearings 30 allow rotational movement of motor drive shaft 28 about the vertical axis 36 of the motor 20.

Air seals 32 and packing glands 18 are provided between coal feed pipe 16 and motor housing to prevent hot pressurized coal dust from entering the motor or escaping to the environment through the gap between the coal feed pipe 16 and motor drive shaft 28 and classifier rotor shaft 50. The coal dust is usually at pressures up to about 3 psig and at temperatures up to about 200° F.

Motor stator 24 is secured to motor housing 26, while motor rotor 22 is fixedly connected to motor drive shaft 28. Motor rotor 22 is rotatable within the motor housing 26, as allowed by bearings 30 connected to motor drive shaft 28. Motor rotor 22 and motor stator 24 operate in a conventional, known manner common to electric motors when a power source (not shown) is applied to motor 20. It is also possible to use a hydraulic motor to drive the classifier rotor 60, in which case the motor is modified accordingly. As shown in FIG. 1, motor housing 26 is connected to an upper, conical wall portion 92 of mill housing 12.

When motor 20 is powered, rotor 22 is caused to rotate within the motor housing 26, thereby turning motor drive shaft 28 on bearings 30. Classifier rotor shaft 50 is driven by motor drive shaft 28 and also rotates in the direction R indicated in FIG. 2. Motor 20 preferably rotates the classifier rotor 60 at speeds between 50 and 200 revolutions per minute (rpm).

The use of a variable speed, controllable motor 20 concentrically positioned on pulverizer 10 allows speed reducing gears and mechanisms to be eliminated, while the centrally positioned coal feed pipe 16 is retained in place. Retrofitting of existing pulverizers 10 is made less expensive and less difficult, since the height H of the classifier may remain the same, and the space on the top of the pulverizer 10, which is at a premium because of the large diameter coal feed pipe 16 and burner supply pipes 70, is used more efficiently, preferably without need to reposition said burner supply pipes to gain installation clearance.

While the height H could remain the same by providing a new turret which is a complete top portion of the pulverizer, it is preferred to keep the gear box within the burner pipe circle. In this way one does not have to change the top housing. It is preferable to keep the center line to center line of the burner pipe the same and the burner pipe circle the same. The present invention provides the above advantages.

While a specific embodiment of the invention has been shown and described in detail to illustrate the application of the principles of the invention, it will be understood that the invention may be embodied otherwise without departing from such principles.

What is claimed is:

1. A dynamic classifier for a pulverizer having a mill section for receiving coal to be pulverized and for discharging pulverized coal to be classified, the classifier having a vertical axis and a central feed pipe, the dynamic classifier comprising:

a mill housing;

means defining a classifier chamber in the mill housing with an inlet section for admitting pulverized coal from the mill section into said classifier chamber the central feed pipe extending from above a top of said mill housing concentrically through said classifier chamber and into the mill section of the pulverizer for use with the dynamic classifier, for supplying coal to be pulverized to the mill section;

a motor mounted at the top of the mill housing, the motor having a motor housing connected to the mill housing and around the feed pipe, and a hollow motor shaft positioned concentric with and surrounding the central feed pipe;

a classifier rotor having a hollow classifier shaft concentric with and surrounding the central feed pipe inside the classifier chamber of the vertical axis classifier, the classifier shaft fixedly connected to the hollow motor shaft;

said motor comprising a motor rotor connected to the motor shaft, a motor stator connected to the motor housing and interacting with the rotor for causing rotation of the rotor with respect to the motor housing and, thus, causing rotation of the hollow motor shaft and classifier rotor;

first seal means for sealing a lower end of the classifier rotor shaft with respect to the central feed pipe; and second seal means connected between an upper end of the motor shaft and the feed pipe, said first and second seal means avoiding entry of coal dust into a space between the central feed pipe and the hollow motor shaft.

2. A dynamic classifier according to claim 1, wherein the classifier rotor further comprises a plurality of vertical blades connected to the hollow classifier shaft.

3. A dynamic classifier according to claim 1, wherein the motor is a variable-speed electric motor.

4. A dynamic classifier according to claim 1, wherein the stator and the rotor are oriented concentric with and surrounding the hollow motor shaft.

5. A dynamic classifier according to claim 2, wherein the motor shaft is rotatable at a speed between 50 and 200 revolutions per minute.

6. A dynamic classifier according to claim 5, wherein the feed pipe has a diameter of about 14 to 24 inches.

7. A dynamic classifier according to claim 6, including bearings between said motor shaft and said motor housing, above and below said motor rotor and stator.

8. A dynamic classifier according to claim 7, wherein said motor rotor and stator are concentric, surrounding the hollow motor shaft, said motor comprising a variable-speed electric motor.

9. A dynamic classifier according to claim 8, wherein said motor housing is connected to a conical portion of said mill housing, said conical portion of said mill housing having a top and a plurality of burner supply pipes extending from said top for supplying classified coal from the classifier chamber, said burner supply pipes being spaced around said motor.

* * * * *